(12) United States Patent
Stemm et al.

(10) Patent No.: US 10,264,017 B2
(45) Date of Patent: *Apr. 16, 2019

(54) SYSTEMS AND METHODS OF IDENTIFYING SUSPICIOUS HOSTNAMES

(71) Applicant: Proofpoint, Inc., Sunnyvale, CA (US)

(72) Inventors: Mark Richard Stemm, Santa Monica, CA (US); Arlyn Robert Johns, Oakland, CA (US)

(73) Assignee: PROOFPRINT, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/388,256

(22) Filed: Dec. 22, 2016

(65) Prior Publication Data

US 2017/0104784 A1    Apr. 13, 2017

Related U.S. Application Data

(63) Continuation of application No. 14/508,400, filed on Oct. 7, 2014, now Pat. No. 9,560,074.

(51) Int. Cl.
| | |
|---|---|
| *H04L 29/06* | (2006.01) |
| *G06F 21/00* | (2013.01) |
| *H04L 29/12* | (2006.01) |
| *G06F 21/55* | (2013.01) |
| *G06F 17/30* | (2006.01) |

(52) U.S. Cl.
CPC .... *H04L 63/1483* (2013.01); *G06F 17/30864* (2013.01); *G06F 17/30985* (2013.01);
(Continued)

(58) Field of Classification Search
CPC ...... G06F 21/56; H04L 51/12; H04L 61/1511; H04L 2463/144; H04L 63/1416; H04L 63/1441; H04L 63/1458; H04L 63/1483
See application file for complete search history.

(56) References Cited

U.S. PATENT DOCUMENTS

| | | | |
|---|---|---|---|
| 7,272,853 B2 * | 9/2007 | Goodman | G06Q 10/107 |
| | | | 726/13 |
| 7,409,708 B2 * | 8/2008 | Goodman | H04L 51/12 |
| | | | 726/13 |

(Continued)

FOREIGN PATENT DOCUMENTS

| | | |
|---|---|---|
| JP | 2005-018745 A | 1/2005 |
| JP | 2007-025789 A | 2/2008 |
| JP | 2008-250597 A | 10/2008 |
| JP | 2012-118577 A | 6/2012 |
| WO | 2009155453 A1 | 12/2009 |

OTHER PUBLICATIONS

International Search Report and Written Opinion for International Application No. PCT/US2015/054014 dated Jan. 15, 2016, 12 pages.

(Continued)

*Primary Examiner* — Linglan E Edwards
(74) *Attorney, Agent, or Firm* — Polsinelli LLP

(57) ABSTRACT

A method includes receiving a set of strings and applying one or more filters to generate a subset of strings that are determined to correspond to strings of interest. The method also includes retrieving domain name system (DNS) information associated with a first string of the subset. The method includes executing a rule-based engine to determine, based on application of one or more rules to the DNS information, whether to add the first string to a set of suspicious hostnames.

18 Claims, 7 Drawing Sheets

(52) U.S. Cl.
CPC .......... *G06F 21/55* (2013.01); *H04L 61/1511* (2013.01); *H04L 63/1416* (2013.01); *H04L 63/1458* (2013.01); *H04L 2463/144* (2013.01)

(56) References Cited

U.S. PATENT DOCUMENTS

| | | | |
|---|---|---|---|
| 7,464,264 B2* | 12/2008 | Goodman | G06Q 10/107 713/150 |
| 7,665,131 B2* | 2/2010 | Goodman | G06Q 10/107 726/13 |
| 8,225,402 B1 | 7/2012 | Averbuch et al. | |
| 8,260,914 B1 | 9/2012 | Ranjan | |
| 8,516,585 B2 | 8/2013 | Cao et al. | |
| 8,533,270 B2 | 9/2013 | Starbuck et al. | |
| 8,631,489 B2 | 1/2014 | Antonakakis et al. | |
| 8,745,737 B2 | 6/2014 | Thomas et al. | |
| 8,762,298 B1 | 6/2014 | Ranjan et al. | |
| 8,763,117 B2* | 6/2014 | Carothers | G06F 21/56 726/22 |
| 8,949,982 B2 | 2/2015 | Gould et al. | |
| 9,003,518 B2* | 4/2015 | Wyschogrod | H04L 29/12066 726/22 |
| 9,003,529 B2 | 4/2015 | Lospinuso et al. | |
| 9,053,320 B2 | 6/2015 | Thomas | |
| 9,058,381 B2* | 6/2015 | Thomas | G06F 17/30707 |
| 9,191,398 B2 | 11/2015 | Bolzoni et al. | |
| 9,419,990 B2* | 8/2016 | Levy | H04L 63/1425 |
| 9,961,091 B2* | 5/2018 | Levy | H04L 63/1425 |
| 2008/0120720 A1 | 5/2008 | Guo et al. | |
| 2009/0043721 A1 | 2/2009 | Reznik et al. | |
| 2009/0172815 A1* | 7/2009 | Gu | G06F 21/552 726/23 |
| 2012/0054860 A1* | 3/2012 | Wyschogrod | H04L 29/12066 726/22 |
| 2012/0101808 A1 | 4/2012 | Duong-Van | |
| 2013/0031625 A1* | 1/2013 | Lim | G06F 21/552 726/22 |
| 2013/0060761 A1 | 3/2013 | Hoad et al. | |
| 2013/0097329 A1* | 4/2013 | Alex | H04L 61/1511 709/228 |
| 2013/0139165 A1* | 5/2013 | Doukhvalov | G06F 9/5072 718/102 |
| 2013/0174253 A1* | 7/2013 | Thomas | H04L 63/1416 726/22 |
| 2013/0191915 A1 | 7/2013 | Antonakakis et al. | |
| 2013/0318603 A1 | 11/2013 | Merza | |
| 2014/0007238 A1* | 1/2014 | Magee | G06F 21/577 726/24 |
| 2015/0169722 A1 | 6/2015 | Schueppert et al. | |

OTHER PUBLICATIONS

Born, K., "Detecting DNS Tunnels Using Character Frequency Analysis," eprint arXiv:1004.4358, Apr. 2010, In Proceedings of the 9th Annual Security Conference, 12 pages.

Schiavoni, S. et al., "Tracking and Characterizing Botnets Using Automatically Generated Domains," arXiv:1311.5612v1 [cs.CR] Nov. 21, 2013, 14 pages.

Yadav, S. et al., "Detecting Algorithmically Generated Malicious Domain Names," IT Security for the Next Generation, American Cup, New York, Nov. 9-11, 2011, 14 pages.

"Exercise to detect Algorithmically Generated Domain Names," Retrieved from <http://nbviewer.ipython.org/github/ClickSecurity/data_hacking/blob/master/dga_detection/DGA_Domain_Detection.ipynb>, Retrieved on Oct. 3, 2014, 25 pages.

Wylie, B., GitHub, ClickSecurity/data_hacking, Dec. 2, 2013, Retrieved from <https://github.com/ClickSecurity/data_hacking/tree/master/dga_detection>, Retrieved on Jul. 21, 2014, 5 pages.

"how to check if a string looks randomized, or human generated and pronouncable?," Careers 2.0 by stackoverflow, Jul. 24, 2009, 6 pages.

Warmer, M., "Detection of Web Based Command & Control Channels," Distributed and Embedded Security Group Faculty of Electrical Engineering, Mathematics and Computer Science, University of Twente, Nov. 2011, 85 pages.

Choi, H. et al., "Detecting Malicious Web Links and Identifying Their Attack Types," USENIX, May 5, 2011, pp. 1-12.

Krishnan, S. et al., "Crossing the Threshold: Detecting Network Malfeasance via Sequential Hypothesis Testing," Proceedings of the 2013 43rd Annual IEEE/IFIP International Conference on Dependable Systems and Networks, pp. 1-12.

Marchal, S. et al., "Proactive Discovery of Phishing Related Domain Names," Research in Attacks, Intrusions, and Defenses, Lecture Notes in Computer Science, vol. 7462, 2012, Springer Berlin Heidelberg, pp. 190-209.

Perdisci, R. et al., "Detecting Malicious Flux Service Networks through Passive Analysis of Recursive DNS Traces," Computer Security Applications Conference, 2009, ACSAC 2009, IEEE, Piscataway, NJ, Dec. 7, 2009, pp. 311-320.

Antonakakis, M. et al., "From Throw-Away Traffic to Bots: Detecting the Rise of DGA-Based Malware," USENIX Security Symposium, Aug. 2012, pp. 491-506.

Davuth, N. et al., "Classification of Malicious Domain Names using Support Vector Machine and Bi-gram Method," International Journal of Security and Its Applications, vol. 7, No. 1, Jan. 2013, pp. 51-58.

Seifert, C. et al., "Identification of Malicious Web Pages Through Analysis of Underlying DNS and Web Server Relationships," 33rd IEEE Conference on Local Computer Networks, Oct. 14-17, 2008, Montreal, CA, EEE, Piscataway, NJ, Oct. 14, 2008, pp. 935-941.

Raghuram, J. et al., "Unsupervised, low latency anomaly detection of algorithmically generated domain names by generative probabilistic modeling," Journal of Advanced Research, Jan. 2014, pp. 1-11.

Yadav, S. et al., "Detecting Algorithmically Generated Domain-Flux Attacks with DNS Traffic Analysis," IEEE/ACM Transactions on Networking, vol. 20, Issue 5, Oct. 2012, IEEE, pp. 1663-1677.

English translation of the Notification for Reasons for Refusal, dated May 29, 2018, 3 pages, from the Japan Patent Office for the corresponding Japanese Patent Application JP 2017-518999. (Translation obtained from Espacenet on Nov. 28, 2018).

* cited by examiner

SYSTEMS AND METHODS OF IDENTIFYING SUSPICIOUS HOSTNAMES

PRIORITY CLAIM

This application is a continuation of and claims priority from U.S. patent application Ser. No. 14/508,400 filed on Oct. 7, 2014, now U.S. Pat. No. 9,560,074, the content of which is incorporated herein by reference in its entirety.

BACKGROUND

The Internet has become a preferred medium for many different types of communication. For example, popular websites may serve hundreds of millions of users a day. As Internet use has increased, so have the frequency and complexity of malicious uses of the Internet. For example, information technology (IT) administrators may require that an internet security application, an anti-malware application, an anti-spam filter, an anti-phishing filter, etc. be deployed at an enterprise to protect the computing assets of the enterprise from malicious attacks. Due to the large number of websites on the Internet, and the ease with which new websites can be registered, it may be difficult to determine whether a website (or an associated hostname or internet protocol (IP) address) is malicious. To illustrate, it may difficult to automatically and programmatically determine whether a hostname has been generated by a botnet that executes a domain generation algorithm (DGA) to generate randomized hostnames for use in conjunction with malware, spam, phishing, a distributed denial of service (DDoS) attack, or other malicious activity.

SUMMARY

Systems and methods of determining suspicious hostnames (e.g., hostnames produced by a DGA and/or hostnames related to hostnames produced by a DGA) are disclosed. A system may receive strings from various sources, including but not limited to security feeds, DNS query feeds, etc. The strings may include IP addresses, hostnames, domains, name servers, and/or information associated with other Internet-accessible devices or locations. The system may implement a 2-phase process to identify "bad" strings in an input set of strings. In a first phase, the system may reduce the input set into a smaller subset of strings that are determined to be "of interest." For example, the system may filter the input set of strings to identify the subset of strings that are of interest. The input set of strings may be filtered based on n-gram entropy. Alternatively, or in addition, a string can be identified as being of interest if the string corresponds to a hostname that was registered or first encountered by the system within a threshold time period.

In a second phase, the system may evaluate the strings of interest using a rule-based engine to identify "bad" (e.g., suspicious) strings, such as strings corresponding to hostnames that are topologically or algorithmically related to hostnames that are predicted as having been algorithmically generated. The rules used by the rule-based engine may include one or more "guilt by induction" rules. As an illustrative non-limiting example, a hostname may be suspicious if a DNS record of the hostname maps to another hostname that has already been predicted to be algorithmically generated. The system may recursively examine DNS records to build a set of "bad" strings. The set of "bad" strings may be used by various applications to enhance security, including but not limited to mobile security applications, e-mail security applications, DDoS mitigation applications, and DNS security applications.

DETAILED DESCRIPTION

Figure 1:
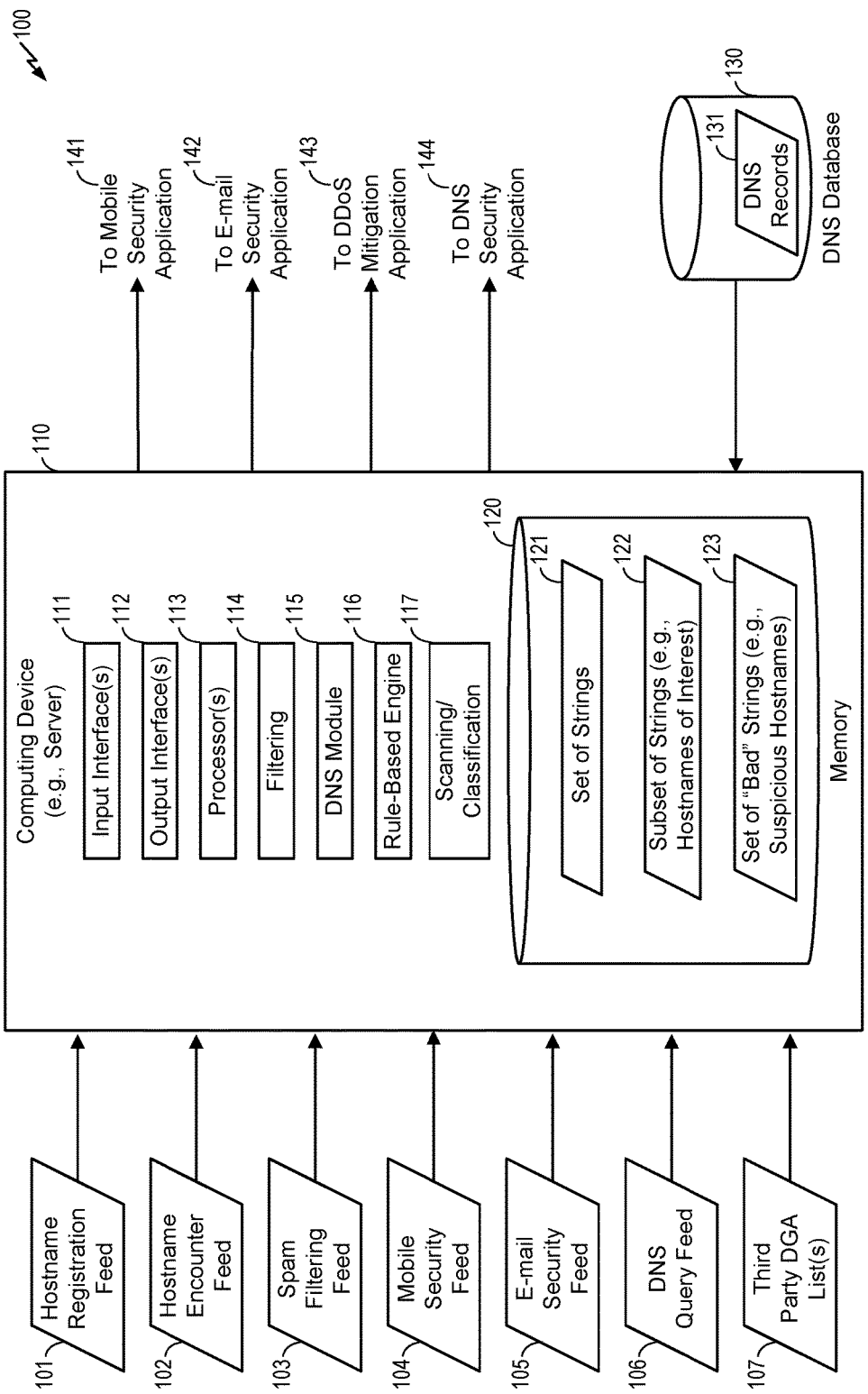
FIG. 1 is diagram to illustrate a particular embodiment of a system of identifying suspicious hostnames.

Referring to FIG. 1, a particular embodiment of a system 100 is shown. The system 100 includes a computing device 110. In an illustrative example, the computing device 110 is a server. As further described herein, the computing device 110 may perform a 2-phase process to identify "bad" (e.g., suspicious) strings. For example, the computing device 110 may generate and update a set of "bad" strings. Initial seeds of the set may be strings corresponding to hostnames that are predicted as being algorithmically generated. DNS information associated with the seeds may be examined to identify additional suspicious hostnames that are topologically or algorithmically related to the seeds. In the 2-phase process, the first phase may include filtering an input set of strings to generate a subset of strings that are "of interest," and the second phase may include evaluating the strings of interest based on execution of a rule-based engine.

The computing device 110 may include one or more input interfaces 111, one or more output interfaces 112, one or more processors 113, and memory 120. For example, the input interface(s) 111 and the output interface(s) 112 may include user input/output interfaces and/or network interface(s) that enable the computing device 110 to communicate data via a network, such as a local area network (LAN), the Internet, etc. Network interface(s) may include wired interfaces, such as Ethernet, as well as wireless interfaces, such as third generation (3G), fourth generation (4G), long term evolution (LTE), LTE-Advanced, and institute of electrical and electronics engineers (IEEE) 802.11. The processor(s) 113 may include central processing units (CPUs), digital signal processors (DSPs), network processing units (NPUs), etc. The processor(s) 113 may be single-threaded, multi-threaded, single-core, multi-core, or combinations thereof. The memory 120 may correspond to random access memory (RAM), disk-based memory, optical disc memory, solid-state memory, another type of memory, or a combination thereof.

The computing device 110 may receive data from a plurality of sources. For example, the computing device 110 may receive strings from a hostname registration feed 101 and a hostname encounter feed 102. The hostname registration feed 101 may provide strings corresponding to hostnames that have been registered with an Internet domain name registration entity. The hostname encounter feed 102 may provide strings corresponding to hostnames that are encountered by a particular device or group of devices (e.g., a mail server, a web server, a name server, an enterprise firewall, etc.) during sending, receiving, and/or processing of Internet traffic.

The computing device 110 may also receive strings from a spam filtering feed 103, a mobile security feed 104, an e-mail security feed 105, and/or a DNS query feed 106. The spam filtering feed 103 may provide strings corresponding to hostnames that are detected in e-mails by a spam filtering application, such as a spam filtering application executing at a web mail server or at an enterprise mail server. Alternatively, or in addition, the strings provided by the spam filtering feed 103 may correspond to hostnames that are identified based on e-mails sent to an "abuse box" at an enterprise. For example, employees of the enterprise may forward e-mails determined to be junk or malicious (e.g., phishing) to the abuse box.

The mobile security feed 104 may provide strings corresponding to hostnames identified by a mobile security application, such as a mobile security application executing on one or more mobile devices (e.g., mobile phones, tablet computer, etc.) and/or at an enterprise server. The e-mail security feed 105 may provide strings corresponding to hostnames identified by an e-mail security application, such an application executing at individual computing devices, an enterprise server, and/or a mail server to perform anti-malware scanning and other e-mail security operations.

The DNS query feed 106 may provide strings corresponding to hostnames that are processed by a DNS server (e.g., during processing of DNS queries). The strings provided by the DNS query feed 106 may also correspond to hostnames that are read from and/or written to DNS records stored at the DNS server (or at a database accessible to the DNS server).

The computing device 110 may further receive strings from third party DGA lists 107. For example, the computing device 110, or an entity associated therewith, may subscribe to a service that provides a list of hostnames that are suspected, or have been confirmed, as being output by a DGA.

It should be noted that in alternate embodiments, the computing device 110 may receive strings corresponding to potential hostnames from more, fewer, and/or different data sources than those illustrated in FIG. 1. Regardless of the specific data sources available in the system 100, it will be appreciated that the computing device 110 may receive a large number of strings, which are illustrated in FIG. 1 as an input set of strings 121. For example, in the case of a popular DNS server during peak traffic periods, the DNS query feed 106 may provide the computing device 110 over a million strings per second.

The computing device 110 may include components that are configured to process the received set of strings 121. In the illustrated example, the computing device 110 includes a filtering module 114, a DNS module 115, a rule-based engine 116, and a scanning/classification module 117. The filtering module 114, the DNS module 115, the rule-based engine 116, and the scanning/classification module 117 may be implemented using hardware, software (e.g., instructions executable by the processor(s) 113), or both. The filtering module 114 may be configured to filter the received set of strings 121 into a smaller subset 122 of strings that are determined to correspond to strings "of interest". In a particular embodiment, the filtering module 114 is configured to apply a plurality of filters to the set of strings 121, including a filter based on n-gram entropy and a filter based on string length, as illustrative non-limiting examples. Examples of operations performed by the filtering module 114 are further described with reference to FIG. 2.

The DNS module 115 may be configured to retrieve DNS information associated with strings of the subset 122. For example, the DNS module 115 may access DNS records 131 stored at a DNS database 130 to retrieve DNS information associated with a particular hostname. Examples of the DNS records 131 are further described with reference to FIG. 3.

The rule-based engine 116 may determine whether a string of the subset 122 is a "bad" string. For example, a string may be a "bad" string if the string corresponds to a hostname that is predicted as being algorithmically generated (e.g., output by a DGA), or a hostname that is related to a hostname that has been predicted to be algorithmically generated. The rule-based engine 116 may apply one or more rules to the DNS information associated with the string to determine if the string is a "bad" string. In FIG. 1, the rule-based engine 116 generates a set 123 of "bad" strings. Items included in the set 123 of "bad" strings may include hostnames, IP addresses, name servers, and other Internet-accessible entities. Examples of operations performed by the rule-based engine 116 are further described with reference to FIG. 4.

During operation, the computing device 110 may receive the set of strings 121 and the filtering module 114 may apply one or more filters to the set of strings 121 to generate the subset 122 of strings determined to correspond to hostnames of interest. The DNS module 115 may retrieve DNS information associated with string(s) of the subset 122, and the rule-based engine 116 may be executed to determine, based on application of one or more rules to the DNS information, whether to add the string(s) to the set 123 of "bad" strings. The process may be recursively performed to expand membership of the set 123 of "bad" strings. For example, the computing device 110 may identify a second string (e.g., a hostname) based on DNS information associated with a first string (e.g. a first hostname). In response, DNS information for the second string may be retrieved and provided to the rule-based engine 116 to determine whether to add the second string to the set 123 of "bad" strings. The recursive process may continue as additional strings (e.g., hostnames) are encountered.

Figure 2:
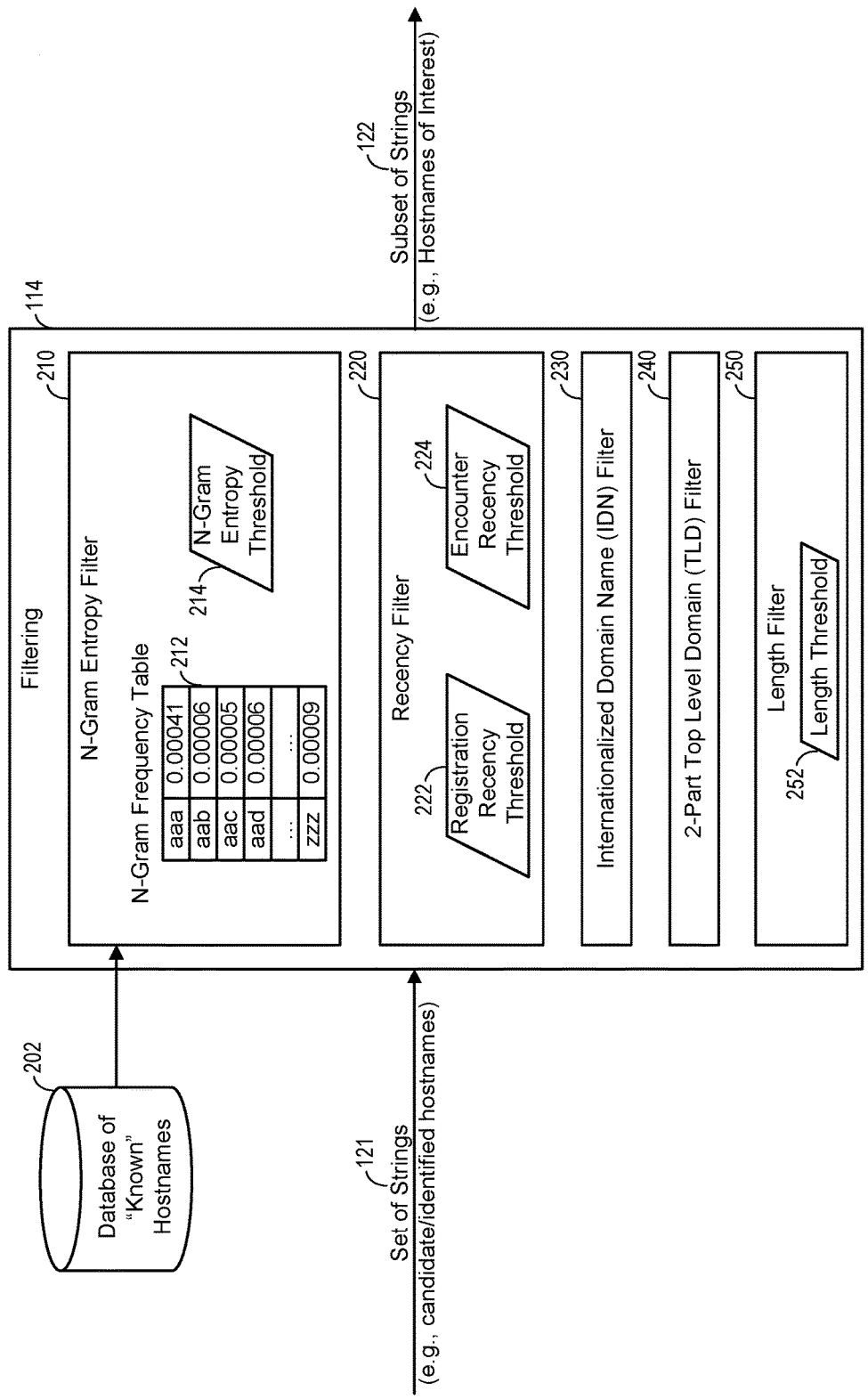
FIG. 2 is a diagram to illustrate a particular embodiment of a filtering module that may be included in the system of FIG. 1.

In a particular embodiment, the set 123 of "bad" strings is initially formed by identifying "seeds" that are predicted as being algorithmically generated hostnames. As an illustrative non-limiting example, the seeds may be identified using an n-gram entropy filter. Use of the n-gram entropy filter may result in including sufficiently "random" hostnames in the set 123 of "bad" strings. An example of an n-gram entropy filter and other filters that may be applied by the filtering module 114 are further described with reference to FIG. 2. In FIG. 2, the filtering module 114 includes (e.g., is configured to apply) an n-gram entropy filter 210, a recency filter 220, an internationalized domain name (IDN) filter 230, a 2-port top level domain (TLD) filter 240, and a length filter 250. In alternative embodiments, more, fewer, and/or different filters may be applied by the filtering module 114.

In a particular embodiment, the filtering module 114 is used to perform two filtering operations: filtering a database 202 (e.g., relational database) of "known" hostnames to identify seeds for initially building the set 123 of "bad" strings, and filtering the set of strings 121 to generate the subset 122 of strings.

In a particular embodiment, identifying seeds for the set 123 of "bad" strings may include applying the n-gram entropy filter 210, the IDN filter 230, the 2-part TLD filter 240, and the length filter 250 to the strings stored in the database 202. The n-gram entropy filter 210 may access the database 202, which may store some or all hostnames that have been processed to the computing device 110 (e.g., including both "bad" hostnames associated with malicious activity as well as "good" hostnames corresponding to legitimate Internet websites). Alternatively, the n-gram entropy filter 210 may evaluate only "bad" hostnames or only "good" hostnames. The n-gram entropy filter 210 may calculate a frequency of all n-grams across at least a domain portion of hostnames stored in the database 202. In the illustrated example, n=3 and the n-gram entropy filter 210 generates a frequency table 212 indicating the frequency of 3-grams (e.g., aaa, aab, aac, zzz). In alternative embodiments, n may have a different value. Generating the frequency table 212 may be a one-time operation, and the frequency table 212 may be stored for subsequent use.

After generating the frequency table 212, the n-gram entropy filter 210 may determine whether an n-gram entropy of the particular hostname satisfies an n-gram entropy threshold 214. The n-gram entropy of the particular string may be a function (e.g., sum, weighted sum, average, weighted average, etc.) of the frequencies of occurrence of the n-grams included in the particular hostname. As an example, for the string "exampledomain.com", the n-gram entropy may be a function of the frequencies of occurrence (as indicated in the frequency table 212) of the n-grams: "exa", "xam", "amp", "mpl", etc. The n-gram entropy threshold 214 may be determined programmatically or via user input. In a particular embodiment, the n-gram entropy threshold 214 is generated by sorting the hostnames of the database 202 by n-gram entropy and identifying an n-gram entropy value such that at least a particular percentage (e.g., 95%, 99%, or some other value) of hostnames below the n-gram entropy threshold appear to be "bad" strings (e.g., randomly generated hostnames). In an illustrative example for n=3, the n-gram entropy threshold is approximately 0.00035, although a different value may be used in other embodiments.

The IDN filter 230 may determine whether a hostname is an IDN. In a particular embodiment, the IDN filter 230 checks if the hostname starts with an IDN prefix, such as "xn—". The 2-part TLD filter 240 may determine whether a hostname is a 2-part TLD, such as "example.com". The length filter 250 may determine whether a hostname is longer than a length threshold, such as 10 characters long, although in other embodiments a different length threshold may be used.

In a particular embodiment, a hostname from the database 202 may be used as a seed for the set 123 of "bad" strings if the n-gram entropy of a hostname is less than the n-gram entropy threshold 214, the hostname is a 2-part TLD, the hostname is not an IDN, and the hostname is longer than the length threshold 252. In alternative embodiments, a different combination of filters may be used to seed the set 123 of "bad" strings.

The filtering module 114 may also be used to reduce the set of strings 121 into the subset 122 of strings corresponding to hostnames of interest. For example, a string of the set of strings 121 may be included in the subset 122 if the recency filter 220 determines that the string satisfies a registration recency threshold 222 or an encounter recency threshold 224. Thus, strings corresponding to hostnames that were registered (e.g., with an Internet domain name registration entity) within a threshold time period or first encountered by the computing device 110 within a threshold time period may be added to the subset 122. In another example, a string from the set of strings 121 may be added to the subset 122 if the string satisfies the aforementioned seeding conditions (e.g., the string satisfies the n-gram entropy threshold 214, the length threshold 252, is a 2-part TLD, and is not an IDN). In alternative embodiments, a different combination of filters may be applied to reduce the set of strings 121 to the subset 122 of strings corresponding to hostnames of interest.

Figure 3:
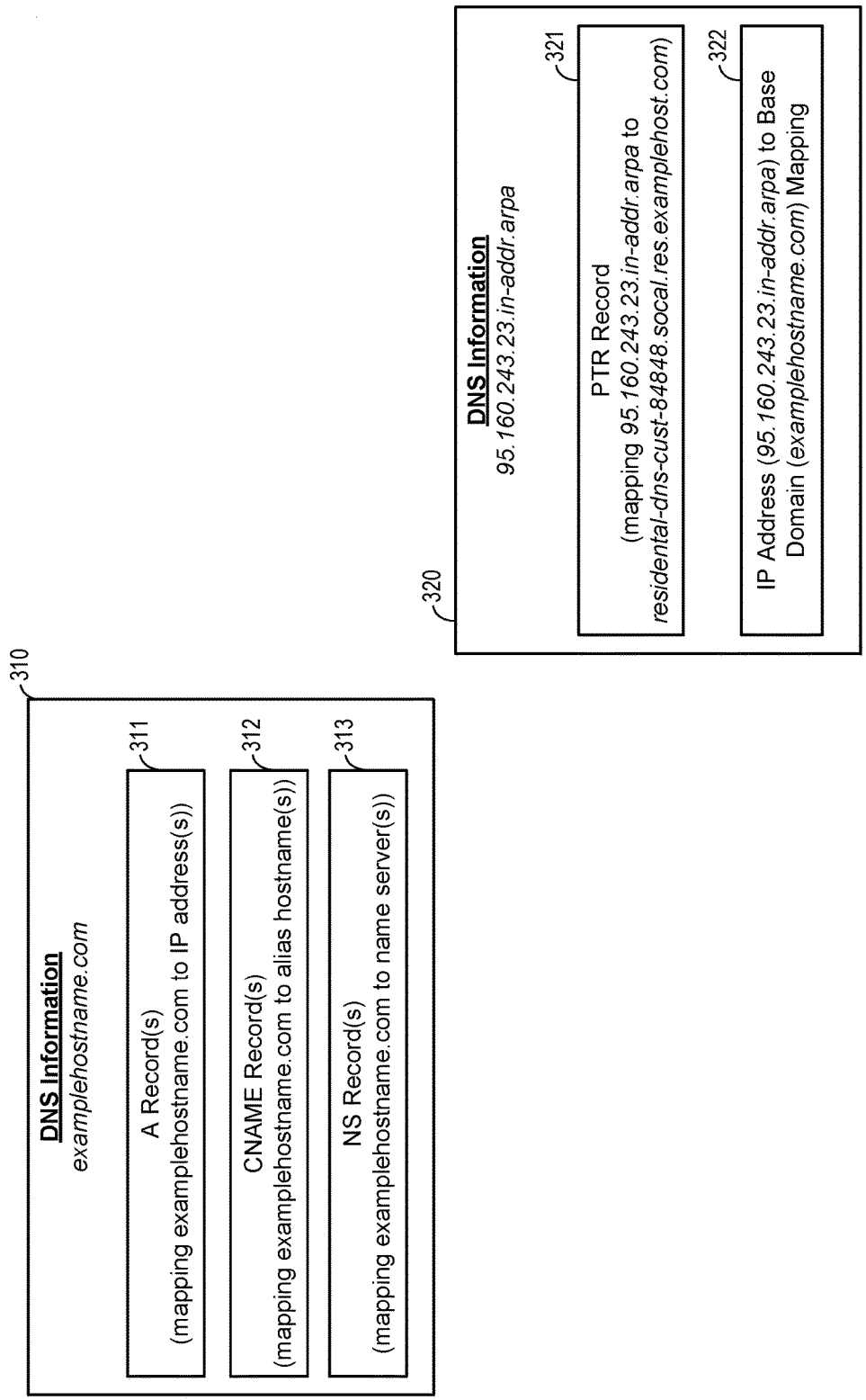
FIG. 3 is a diagram to illustrate a particular embodiment of a rule-based engine that may be included in the system of FIG. 1.

When a string is identified as being a hostname of interest, "neighbors" of the hostname of interest may be identified. For example, the DNS module 115 may access the DNS records 131 associated with the hostname of interest to identify additional hostnames. FIG. 3 illustrates examples of mapping information (e.g., DNS records and other mapping information) that may be used in accordance with the present disclosure. In FIG. 3, first DNS information 310 corresponds to "examplehostname.com" and second DNS information 320 corresponds to an IP address 23.243.160.95 (expressed as a hostname 95.160.243.23.in-addr-arpa).

DNS information for a hostname may include a variety of DNS records. In FIG. 3, the DNS information 310 for "examplehostname.com" includes address (A) record(s) 311 that map the hostname to an internet protocol version 4 (IPv4) address, canonical name (CNAME) record(s) 312 that map the hostname to another (e.g., alias) hostname, and name server (NS) record(s) 313 that map the hostname to an authoritative name server. Additional examples of DNS records are further described herein.

DNS information for an IP address may include pointer (PTR) record(s) corresponding to reverse DNS mappings of the IP address to hos tname(s). For example, the DNS information 320 includes a PTR record 321 mapping the IP address 23.243.160.95, which is expressed as a hostname 95.160.243.23.in-addr.arpa, to the hostname residental-dns-cust-84848.socal.res.examplehost.com.

Various types of records may be stored for an IP address, mapping the IP address (e.g., a.b.c.d) to a domain named (d.c.b.a.in-addr.arpa). For example, the records may include PTR records, NS records, and/or zone information (e.g., start of authority (SOA)) records, as illustrative non-limiting examples. When a query is issued (e.g., by the computing device 110), the query may generate a variety of record types as a response. Certain record types may be retained for future use. For example, CNAME records, A records, NS records, SOA records, text (TXT) records, mail exchange (MX) records, and/or PTR records may be retained, as illustrative non-limiting examples. Further, domains and/or IP addresses included in the query results may be retained (e.g., added to a relationship database) to track connections between a queried domain/IP address and the resulting domains/IP addresses.

In the case of PTR records that map an IP address to a hostname, a mapping from the IP address to a base domain portion of a hostname may also be retained, as the reverse DNS for an IP address may include IP address octets as a part of the hostname (e.g., the IP address a.b.c.d may map to d.c.b.a.example.com). In certain situations, a full hostname may not be of interest but a portion of the hostname may be of interest. To illustrate, "examplehost.com" may be known to be associated with a malicious entity, may be known to be used for spam or phishing, etc. In this situation, a PTR record that maps to the full hostname may not be useful, because the base domain portion of the hostname, "examplehost.com", and not the full hostname, is associated with a malicious entity. For example, a mapping 322 from "95.160.243.23.in-addr.arpa" to the base domain portion "examplehost.com" may be stored. Thus, as used herein, "DNS information" and "DNS records" used to identify "bad" strings may include registered resource record (RR) types as well as unregistered records/mappings (e.g., the IP address to base domain mapping 322).

Figure 4:
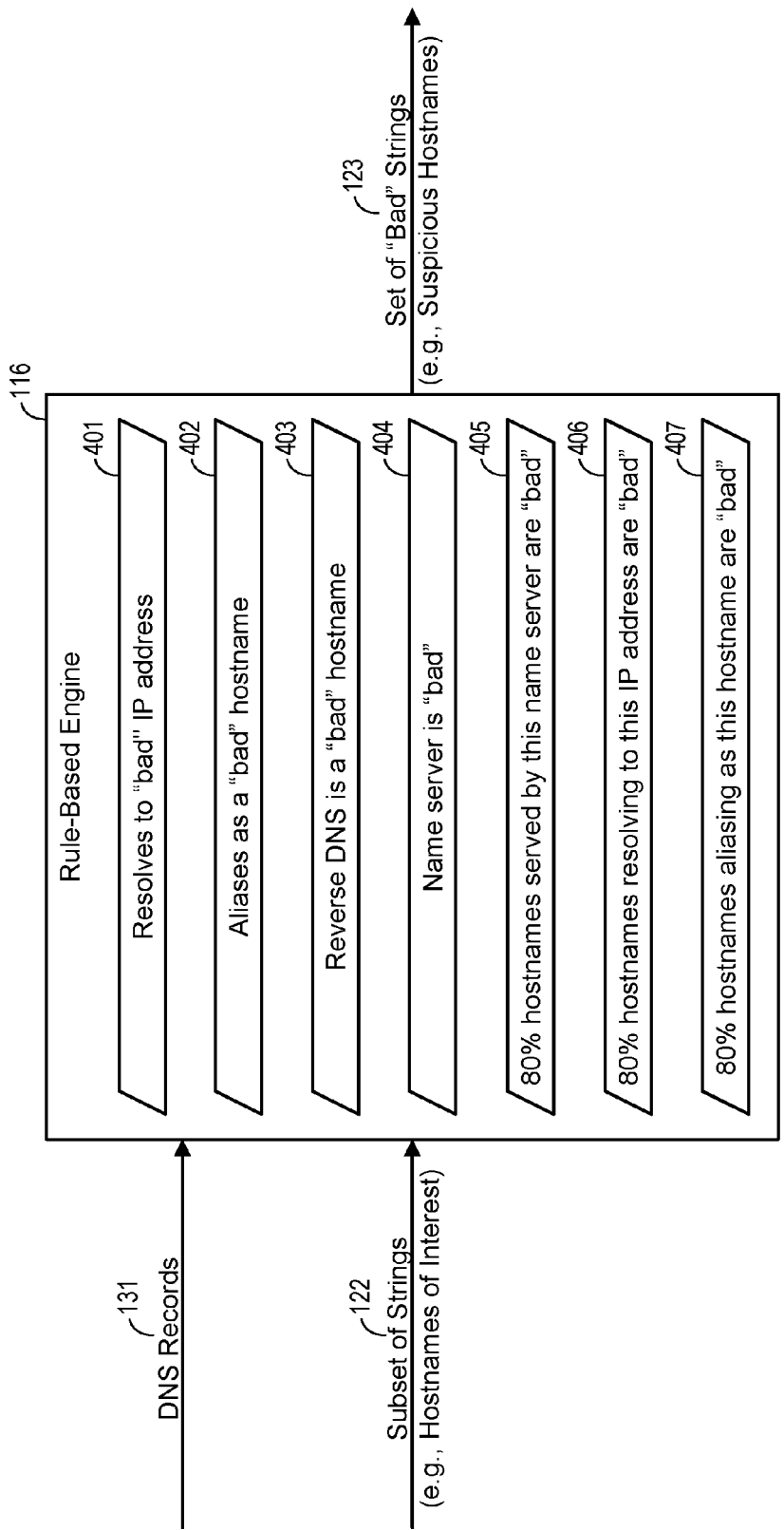
FIG. 4 is a diagram to illustrate examples of DNS records that may be accessed by the system of FIG. 1.

The DNS records retrieved by the DNS module 115 may be provided to the rule-based engine 116. For example, as shown in FIG. 4, the rule-based engine 116 may apply one or more rules to the DNS records 131 retrieved by the DNS module 115 to determine whether a string should be added to the set 123 of "bad" strings. The rule-based engine 116 may thus be used to "grow" the membership of the set 123 of "bad" strings after the set 123 of "bad" strings has been seeded as described with reference to FIG. 2.

The rules applied by the rule-based engine 116 may include a rule indicating that a string is to be added to the set 123 of "bad" strings when a DNS record of the string maps to an item (e.g., a hostname or IP address) that is associated with another string that is already included in the set 123 of "bad" strings. For example, a first rule 401 indicates that a string is to be added to the set 123 of "bad" strings if the string resolves to a "bad" IP address (e.g., an A record of the string resolves to an IP address included in the set 123 of "bad" strings). A second rule 402 indicates that a string is to be added to the set 123 of "bad" strings if the string resolves to a "bad" hostname (e.g., a CNAME record of the string resolves to a hostname included in the set 123 of "bad" strings). A third rule 403 indicates that a string is to be added to the set 123 of "bad" strings if a reverse DNS lookup of the string resolves to a "bad" hostname (e.g., a PTR or PTRD record of the string resolves to a hostname included in the set 123 of "bad" strings). A fourth rule 404 indicates that a string is to be added to the set 123 of "bad" strings if the string resolves to a "bad" name server (e.g., a NS record of the string resolves to a name server included in the set 123 of "bad" strings).

The rules may also include a rule indicating that a string is to be added to the set 123 of "bad" strings when more than a threshold percentage of DNS records that map to the string are associated with "bad" strings that are already included in set 123. In FIG. 4, the threshold percentage is 80%, although a different value may be used in alternative embodiments. Thus, a fifth rule 405 indicates that a name server is to be added to the set 123 of "bad" strings if at least 80% of hostnames served by the name server are "bad" (e.g., 80% of NS records mapping to the name server correspond to items included in the set 123 of "bad" strings). A sixth rule 406 indicates that an IP address is to be added to the set 123 of "bad" strings if at least 80% of hostnames resolving to the IP address are "bad" (e.g., 80% of A records mapping to the IP address correspond to items included in the set 123 of "bad" strings). A seventh rule 407 indicates that a hostname is to be added to the set 123 of "bad" strings if at least 80% of other hostnames aliasing as the hostname are "bad" (e.g., 80% of CNAME records mapping to the hostname correspond to items included in set 123 of "bad" strings).

It should be noted that the rules illustrated in FIG. 4 are for example only, and are not to be considered limiting. The rule-based engine 116 may use a different combination of rules in alternative embodiments. Based on application of the rules 401-407, the rule-based engine 116 may identify "bad" strings in the subset 122 of strings corresponding to hostnames of interest. The identified "bad" strings may be added to the set 123 of "bad" strings. In a particular embodiment, each time a "bad" string is identified and added to the set 123 of "bad" strings, DNS information for the "bad" string is retrieved and the rule-based engine 116 is iteratively executed to process the DNS information and identify additional "bad" strings to add to the set 123 of "bad" strings.

Returning to FIG. 1, when a hostname is added to the set 123 of "bad" strings, the scanning/classification module 117 may determine additional information associated with the string. For example, the scanning/classification module 117 may access a website, access DNS information, etc. associated with the "bad" string to determine how to classify the "bad" string. To illustrate, a hostname, an IP address, a name server, etc. may be classified in a malware category, a spam category, a phishing category, etc.

In a particular embodiment, the memory 120 stores additional information associated with the set 123 of "bad" strings. For example, when an item is added to the set 123 of "bad" strings, the memory 120 may store a reason that the item was added to the set 123. To illustrate, the memory 120 may store data identifying the particular rule(s) executed by the rule-based engine 116 that were satisfied by the item. The memory 120 may also store data identifying a "breadcrumb" item (e.g., a hostname, an IP address, etc.) whose DNS information led to the item being added to the set 123. Thus, the memory 120 may store data that enables a user or administrator to subsequently determine why a particular item was added to the set 123 of "bad" strings.

The set 123 of "bad" strings may be used to improve computer security. For example, the computing device 110 may provide the set 123 of "bad" strings to a mobile security application 141, an e-mail security application 142, a DDoS mitigation application 143, a DNS security application 144, and/or other applications/devices. The applications 141-144 may use the set 123 of "bad" strings to make security decisions regarding Internet traffic processed by the applications 141-144. As an example, the mobile security application 141 may restrict or place increased security measures on traffic that is determined to be associated with an item included in the set 123 of "bad" strings. As another example, the e-mail security application 142 may block incoming e-mails from sources included in the set 123 of "bad" strings. As yet another example, the DDoS mitigation application 143 may ignore or otherwise dispose of DNS queries associated with an item included in the set 123 of "bad" strings, which may enable mitigating a DDoS attack caused by receiving a large number of queries associated with "bad" hostnames or servers. As yet another example, the DNS security application 144 may disable access or modification of records (e.g., the DNS records 131) in a DNS database (e.g., the DNS database 130) based on queries/requests associated with items included in the set 123 of "bad" strings.

The system 100 described with reference to FIGS. 1-4 may thus automatically identify clusters (e.g., sets) of suspicious items without classifying legitimate name servers and IP addresses as suspicious. For example, the suspicious items, such as hostnames, may be topologically and/or algorithmically related. Further, the system 100 may identify suspicious hostnames based on input data received from various sources and may provide the identified hostnames to various computer security applications.

Figure 5:
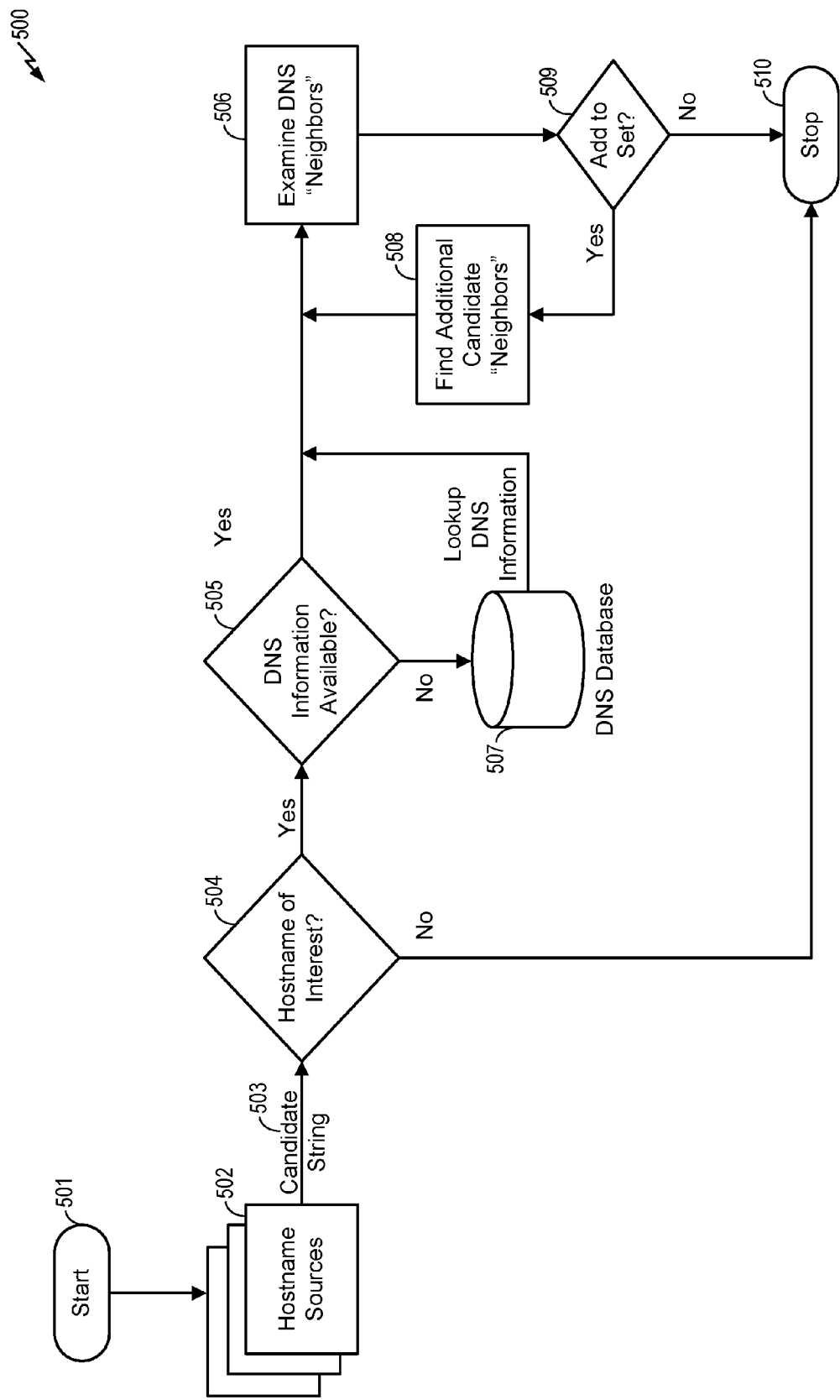
FIG. 5 is a data flow diagram of a particular embodiment of a method of identifying suspicious hostnames.

FIG. 5 is a data flow diagram that illustrates a particular embodiment of a method 500 of identifying suspicious hostnames. The method 500 starts at 501. At 502, one or more hostname sources provide a candidate string 503 corresponding to a hostname that may or may not be algorithmically generated. At 504, a determination may be made as to whether the candidate string 503 is a hostname of interest. For example, whether or not the candidate string 503 is a hostname of interest may be determined based on n-gram entropy of the candidate string 503, as described with reference to the n-gram entropy filter 210 of FIG. 2. If the candidate string 503 is not a hostname of interest, the method 500 stops, at 510.

If the candidate string 503 is a hostname of interest, a determination may be made, at 505, as to whether DNS information is available (e.g., cached at a computing device, such as the computing device 110) for the hostname of interest. If DNS information is not available, the DNS information may be retrieved from a DNS database 507, which may correspond to the DNS database 130 of FIG. 1, using a DNS lookup operation. If DNS information is available, or after the DNS lookup operation is performed, the method 500 includes examining DNS "neighbors" (e.g., all DNS "neighbors") of the hostname of interest, at 506. To illustrate, a DNS "neighbor" of a hostname may correspond to another hostname, an IP address, a name server, or another Internet-accessible entity that is identified by at least one DNS record of the hostname.

Continuing to 509, a determination may be made regarding whether to add any of the DNS "neighbor(s)" to a set (e.g., the set 123 of "bad" strings). In an illustrative example, the determination is made as described with reference to operation of the rule-based engine 116 in FIG. 4. If none of the DNS "neighbors" is added to the set, the method 500 stops, at 510. If one or more DNS "neighbors" is added to the set, the method 500 proceeds to 508 and additional candidate "neighbors" (of the "neighbors" added to the set) are identified and examined. The method 500, or portions thereof, may be repeated as additional candidate "neighbors" are identified. The method 500 may end, at 510, when all candidate "neighbors" and candidate strings from hostname sources have been processed.

Figure 6:
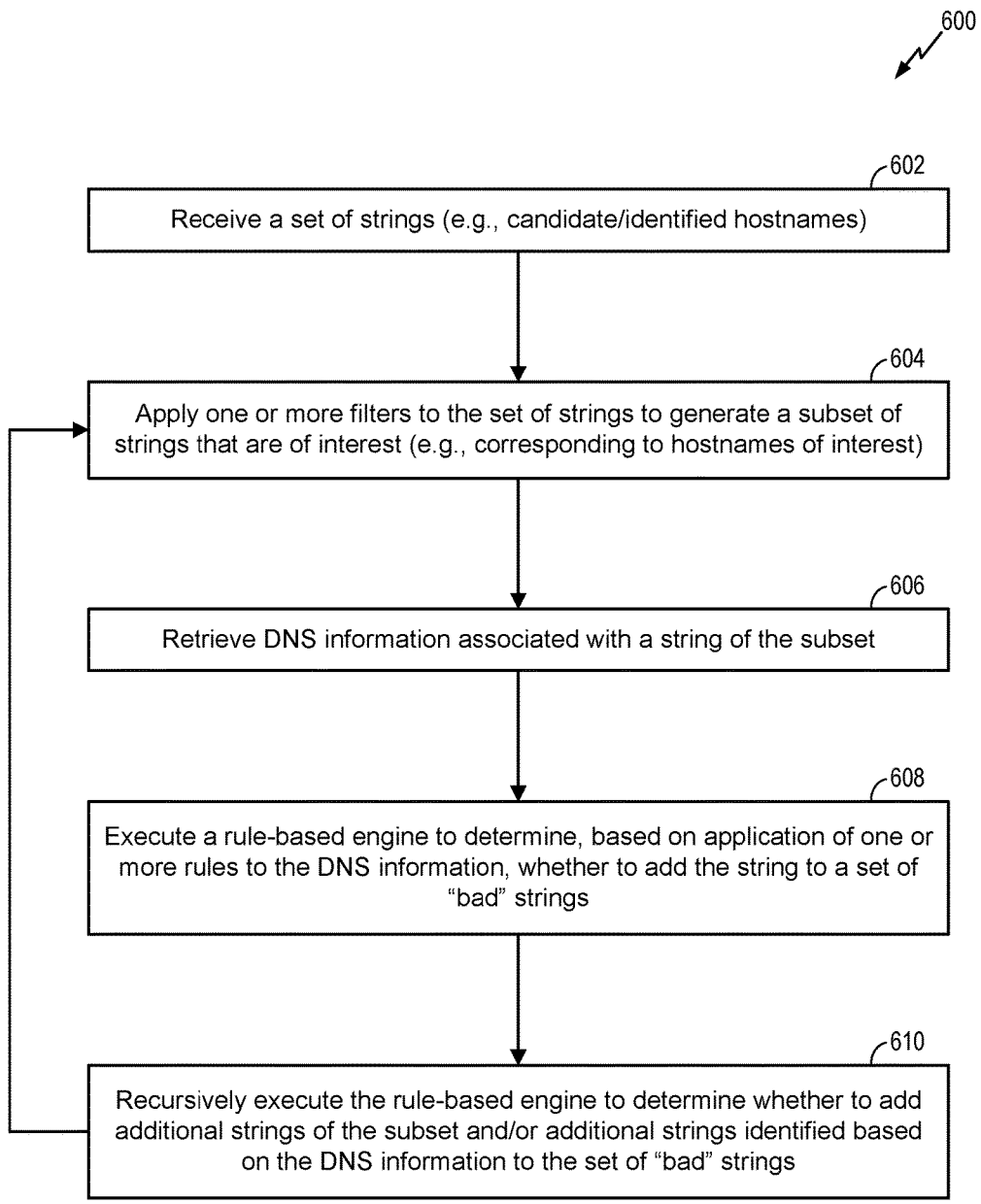
FIG. 6 is a flowchart to illustrate another particular embodiment of a method of identifying suspicious hostnames.

FIG. 6 is a flowchart to illustrate another particular embodiment of a method 600 of identifying suspicious hostnames. In an illustrative embodiment, the method 600 is performed by the computing device 110 of FIG. 1.

The method 600 may include receiving a set of strings, at 602. The strings may correspond to candidate and/or identified hostnames. For example, in FIG. 1, the computing device 110 may receive the set of strings 121, which may include strings provided by the hostname registration feed 101, the hostname encounter feed 102, the spam filtering feed 103, the mobile security feed 104, the e-mail security feed 105, the DNS query feed 106, and/or the third party DGA lists 107.

The method 600 may also include applying one or more filters to the set of strings to generate a subset of strings that are of interest, at 604. For example, the filtering module 114 of FIG. 1 may filter the set of strings 121 to generate the subset 122 of strings, which may include hostnames that are determined to be of interest based on application of one or more of the filters 210, 220, 230, 240, 250 of FIG. 2.

The method 600 may further include retrieving DNS information associated with a string of the subset, at 606. For example, the DNS module 115 of FIG. 1 may retrieve DNS information from the DNS database 130. In an illustrative embodiment, the retrieved DNS information may include A record(s), CNAME record(s), NS record(s), PTR record(s), PTRD record(s), and/or other types of DNS records, as described with reference to FIG. 3.

The method 600 may include executing a rule-based engine to determine, based on application of one or more rules to the DNS information, whether to add the string to a set of "bad" strings, at 608. For example, the rule-based engine 116 may apply one or more rules, such as one or more of the rules 401-407 of FIG. 4, to determine whether to add a string to the set 123 of "bad" strings.

The method 600 may also include recursively executing the rule-based engine to determine whether to add additional strings of the subset and/or additional strings identified based on the DNS information to the set of "bad" strings, at 610. For example, when a "bad" string is added to the set 123, the DNS module 115 may retrieve DNS information associated with the "bad" string and the rule-based engine may apply the rules 401-407 to determine whether any additional strings included in or related to the DNS information are also "bad" strings. The method 600 may thus enable automated identification of "bad" strings, such as suspicious hostnames, IP addresses associated with such hostnames, name servers associated with such hostnames, etc.

Figure 7:
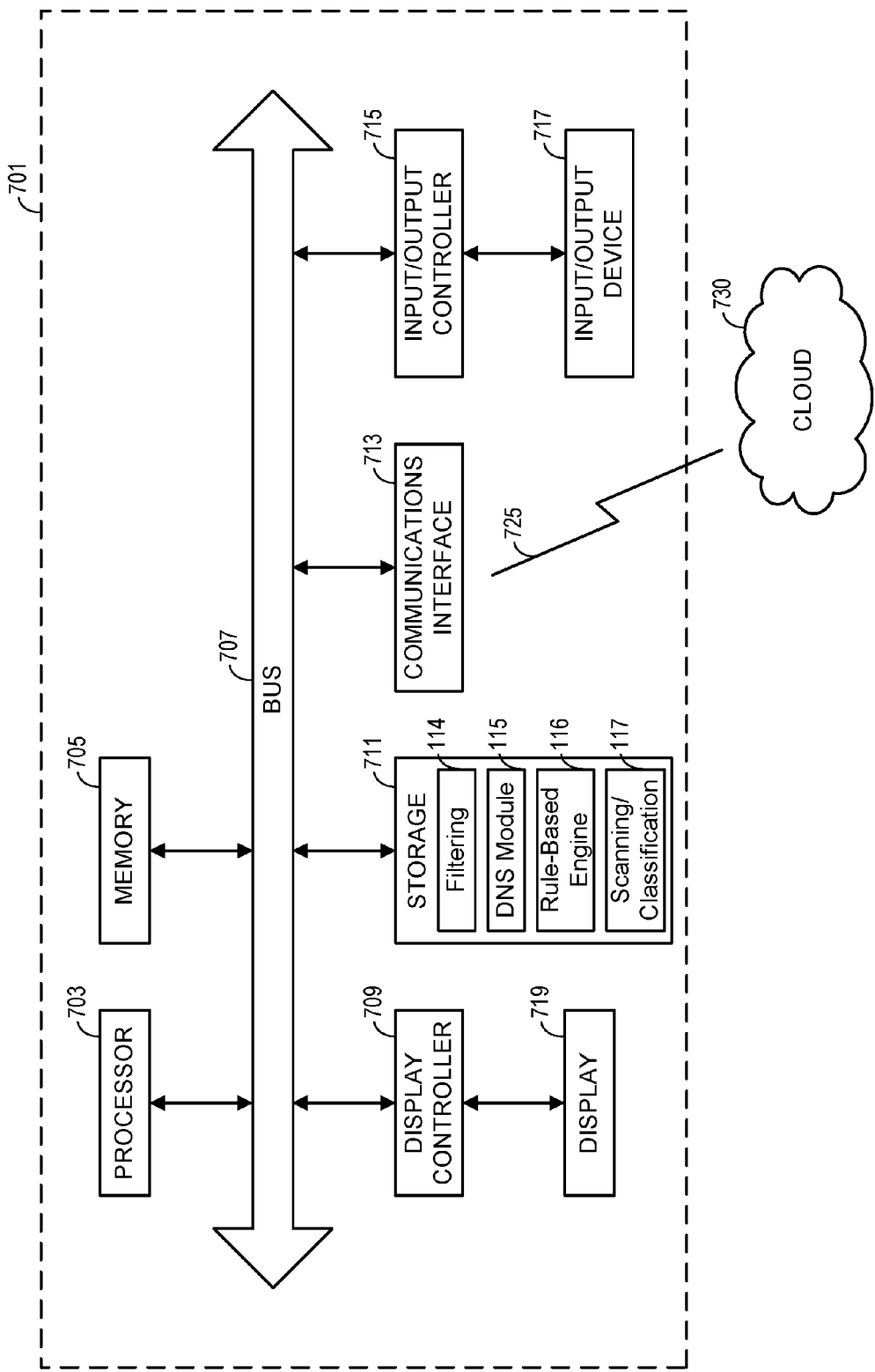
FIG. 7 is a diagram of a particular embodiment of a computing device that may be used to implement aspects of the present disclosure.

FIG. 7 illustrates an embodiment of a computing device 701 that may be used in accordance with embodiments of the disclosure. The computing device 701 may be a computer, a server, or other device that includes a processor 703. A memory 705, storage 711, a display controller 709, a communications interface 713, and an input/output controller 715 are coupled to a bus 707.

The computing device 701 may interface to external systems and devices through a communications interface 713. The communications interface 713 may include a wired and/or wireless networking interface, such as an Ethernet interface, an IEEE 802.11 interface, a 3G interface, a 4G interface, a LTE interface, a LTE-Advanced interface, etc.

In a particular embodiment, a communication signal 725 may be received/transmitted between the communications interface 713 and a cloud 730 (e.g., corresponding to a cloud computing environment). The communication signal 725 may be used to interface the computing device 701 with another computer system, a gateway, a server, a router, or the like.

In a particular embodiment, the processor 703 may be a microprocessor. The memory 705 may be a machine-readable (e.g., computer-readable or processor-readable) storage medium or storage device, such as dynamic random access memory (DRAM), static random access memory (SRAM), etc. A machine-readable medium or device is not a signal.

The display controller 709 may controls a display 719, which may be a liquid crystal display (LCD), a television monitor, or another type of display. An input/output device 717 coupled to the input/output controller 715 may include a keyboard, a disk drive, a printer, a scanner, a mouse, a trackball, a trackpad, or another input and/or output device.

The storage 711 may include a machine-readable medium or device, which may include but is not limited to a magnetic hard disk, a floppy disk, an optical disk, a smart card, or another form of storage for data. In a particular embodiment, the storage 711 includes removable media, read-only media, and/or readable/writable media. Some of the data may be written by a direct memory access process into the memory 705 during execution of software by the computing device 701. Software may reside in the storage 711, the memory 705, or may be transmitted or received via modem or the communications interface 713. The storage 711 may store instructions executable by the processor 703 to perform one or more operations or methods described herein, such as all or a portion of the method 500 of FIG. 5 and/or the method 600 of FIG. 6. To illustrate, the storage 711 may store instructions corresponding to the filtering module 114, the DNS module 115, the rule-based engine 116, and the scanning/classification module 117.

In accordance with various embodiments of the present disclosure, the methods, functions, and modules described herein may be implemented by software programs executable by a computer system. Further, in exemplary embodiments, implementations can include distributed processing, component/object distributed processing, and parallel processing. For example, the computing device 110 and/or the computing device 701 may correspond to a cloud computing environment that includes multiple individual computing devices that perform operations in distributed and parallel fashion. Alternatively, virtual computer system processing can be used to implement one or more of the methods or functionality as described herein.

Particular embodiments can be implemented using a computer system executing a set of instructions that cause the computer system to perform any one or more of the methods or computer-based functions disclosed herein. A computer system may include a laptop computer, a desktop computer, a mobile phone, a tablet computer, or any combination thereof. The computer system may be connected, e.g., using a network, to other computer systems or peripheral devices. For example, the computer system or components thereof can include or be included within any one or more of the devices, systems, modules, and/or components illustrated in or described with reference to FIGS. 1-7. In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in one or more computer-readable or a processor-readable devices, such as a centralized or distributed database, and/or associated caches and servers. The terms "computer-readable device" and "processor-readable device" also include device(s) capable of storing instructions for execution by a processor or causing a computer system to perform any one or more of the methods or operations disclosed herein. Examples of such devices include, but are not limited to, random access memory (RAM), flash memory, read-only memory (ROM), programmable read-only memory (PROM), erasable programmable read-only memory (EPROM), electrically erasable programmable read-only memory (EEPROM), register-based memory, solid-state memory, a hard disk, a removable disk, a disc-based memory (e.g., compact disc read-only memory (CD-ROM)), or any other form of storage device. A computer-readable or processor-readable device is not a signal.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, via an input interface, a string that corresponds to a hostname;
   identifying, at a computing device, a data structure that indicates frequencies of occurrence of each of a plurality of n-grams in a first set of strings;
   applying, at the computing device, a filter to determine whether to add the string to a set of potentially suspicious hostnames, the filter including an entropy filter and a recency filter configured to indicate that the string is potentially suspicious in response to determining that the hostname was registered or encountered by the computing device within a threshold time period, wherein the filter is configured to add the string to the set of potentially suspicious hostnames in response to the entropy filter and the recency filter each indicating that the string is potentially suspicious, wherein the entropy filter is configured to indicate that the string is potentially suspicious based on an n-gram entropy of the string, and wherein the n-gram entropy of the string is a function of the frequency of occurrence, indicated by the data structure, for each n-gram in the string;
   retrieving at least one domain name system (DNS) record based on the string or based on a DNS record previously retrieved based on the string;
   executing a rule-based engine to determine whether to add the string to a set of suspicious hostnames; and
   providing the set of suspicious hostnames to a distributed denial of service (DDoS) attack mitigation application configured to selectively ignore DNS queries that are received from sources included in the set of suspicious hostnames.

2. The method of claim 1, wherein the at least one other filter further includes:

an international domain name (IDN) filter configured to indicate that the string is potentially suspicious in response to determining that the string starts with an IDN prefix;
a top level domain (TLD) filter configured to indicate that the string is potentially suspicious in response to determining that the string is a TLD;
a length filter configured to indicate that the string is potentially suspicious in response to determining that a length of the string satisfies a length threshold;
or
a combination thereof.

3. The method of claim 1, further comprising:
identifying a second string based on the at least one DNS record, wherein the second string is distinct from the string;
retrieving at least one second DNS record associated with the second string; and
executing the rule-based engine to determine, based on application of one or more rules to the at least one second DNS record, whether to add the second string to the set of suspicious hostnames.

4. The method of claim 3, further comprising:
identifying a third string based on the at least one second DNS record, wherein the third string is distinct from the string and the second string;
retrieving at least one third DNS record associated with the third string; and
executing the rule-based engine to determine, based on application of one or more rules to the at least one third DNS record, whether to add the third string to the set of suspicious hostnames.

5. The method of claim 1, wherein the at least one DNS record is retrieved from an external DNS database and comprises at least one of an address (A) record, a canonical name (CNAME) record, or a name server (NS) record.

6. The method of claim 1, wherein the at least one DNS record maps the hostname to a network accessible entity, and further comprising adding, by the rule-based engine, the string to the set of suspicious hostnames in response to determining that the network accessible entity is associated with a second string included in the set of suspicious hostnames.

7. The method of claim 1, wherein the at least one DNS record maps a network accessible entity to the hostname, and further comprising adding, by the rule-based engine, the string to the set of suspicious hostnames in response to determining that greater than a threshold percentage of DNS records that map to the hostname are associated with one or more second strings included in the set of suspicious hostnames.

8. The method of claim 1, wherein the first set of strings excludes hostnames that have been determined to be suspicious.

9. The method of claim 1, wherein the first set of strings excludes hostnames that have been determined to be non-suspicious.

10. The method of claim 1, wherein the entropy filter is configured to classify the string based on a comparison of the n-gram entropy of the string to an n-gram entropy threshold.

11. The method of claim 10, wherein the n-gram entropy threshold is further determined based on user input.

12. The method of claim 10, further comprising determining the n-gram entropy threshold by:
sorting the first set of strings by n-gram entropy; and
selecting the n-gram entropy threshold such that at least a particular percentage of the first set of strings fail to satisfy the n-gram entropy threshold.

13. The method of claim 1, wherein the n-gram entropy comprises a sum, a weighted sum, an average, or a weighted average of entries of the data structure that correspond to the n-grams included in the string.

14. The method of claim 1, further comprising blocking at least one incoming e-mail responsive to determining that a source of the at least one incoming e-mail is included in the set of suspicious hostnames.

15. A computer-readable storage device comprising instructions that, when executed by a computer, cause the computer to perform operations comprising:
identifying a string received via an input interface of the computer, wherein the string corresponds to a hostname;
identifying a data structure that indicates frequencies of occurrence of each of a plurality of n-grams in a first set of strings;
applying a filter operation to determine whether to add the string to a set of potentially suspicious hostnames, the filter operation including an entropy filter operation and a recency filter operation configured to indicate that the string is potentially suspicious in response to determining that the hostname was registered or encountered by the computing device within a threshold time period, and wherein the filter operation is configured to add the string to the set of potentially suspicious hostnames in response to the entropy filter operation and the recency filter operation each indicating that the string is potentially suspicious, wherein the entropy filter operation is configured to indicate that the string is potentially suspicious based on an n-gram entropy of the string, and wherein the n-gram entropy of the string is a function of the frequency of occurrence, indicated by the data structure, for each n-gram in the string;
retrieving at least one domain name system (DNS) record based on the string or based on a DNS record previously retrieved based on the string;
executing a rule-based engine to determine whether to add the string to a set of suspicious hostnames; and
providing the set of suspicious hostnames to a distributed denial of service (DDoS) attack mitigation application configured to selectively ignore DNS queries that are received from sources included in the set of suspicious hostnames.

16. The computer-readable storage device of claim 15, wherein the operations further comprise classifying the string into one or more of a plurality of classification categories, wherein the plurality of classification categories includes at least a malware category and a phishing category.

17. The computer-readable storage device of claim 15, wherein the string is received from a mobile security feed, a spam filtering feed, an e-mail security feed, a DNS query feed, or any combination thereof.

18. A system comprising:
a memory configured to store a set of potentially suspicious hostnames and a set of suspicious hostnames;
a processor; and
a filtering module executable by the processor to:
receive a string that corresponds to a hostname;
identify a data structure that indicates frequencies of occurrence of each of a plurality of n-grams in a first set strings;
apply a filter to determine whether to add the string to the set of potentially suspicious hostnames, the filter including an entropy filter and a recency filter configured to indicate that the string is potentially suspicious in response to determining that the hostname was registered or encountered by the computing device within a threshold time period, wherein the filter is configured to add the string to the set of potentially suspicious hostnames in response to the entropy filter and the recency filter each indicating that the string is potentially suspicious, wherein the entropy filter is configured to indicate that the string is potentially suspicious strings based on an n-gram entropy of the string, and wherein the n-gram entropy of the string is a function of the frequency of occurrence, indicated by the data structure, for each n-gram in the string;

retrieve at least one domain name system (DNS) record based on the string or based on a DNS record previously retrieved based on the string;

execute a rule-based engine to determine whether to add the string to the set of suspicious hostnames; and provide the set of suspicious hostnames to a distributed denial of service (DDoS) attack mitigation application configured to selectively ignore DNS queries that are received from sources included in the set of suspicious hostnames.

* * * * *